Feb. 3, 1931.    R. ROSEN    1,790,841
EXPANSION BOLT
Filed Aug. 2, 1927    2 Sheets-Sheet 1
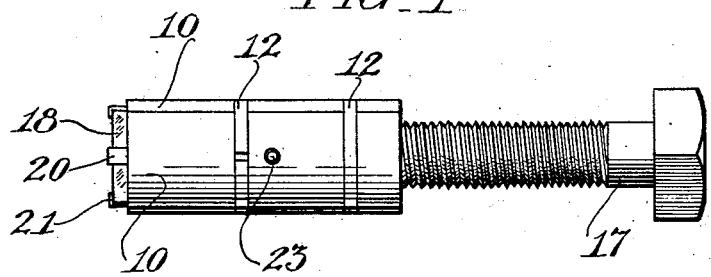
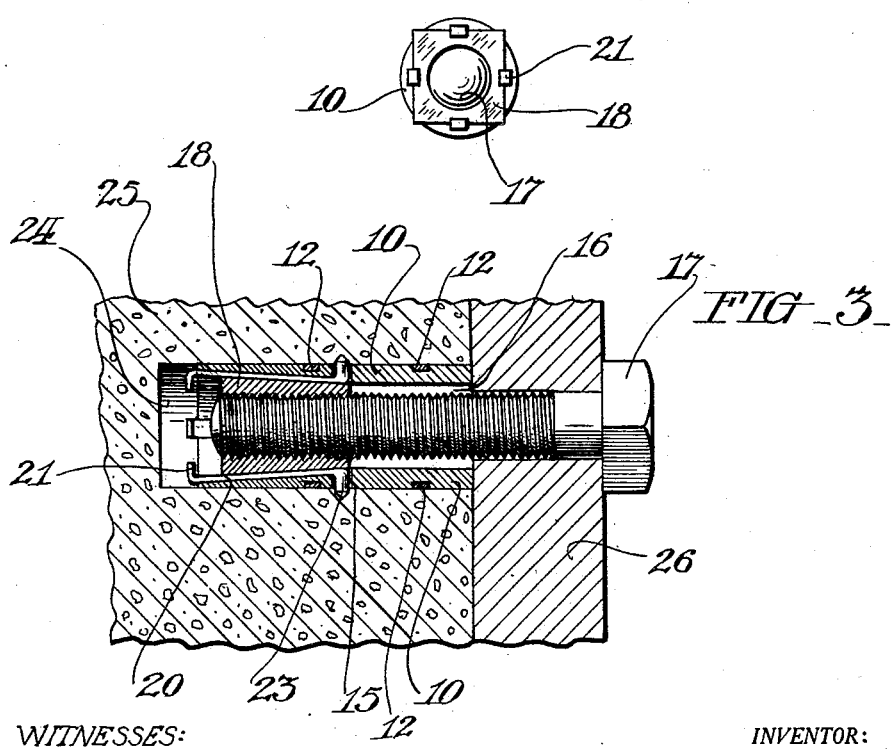
WITNESSES:
Harry C Bright
INVENTOR:
Ruben Rosen,
BY
Joshua R H Potts
ATTORNEY.

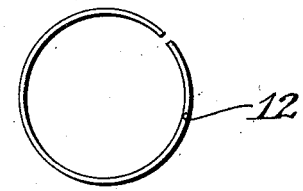
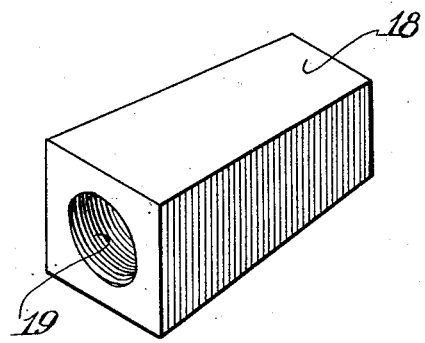
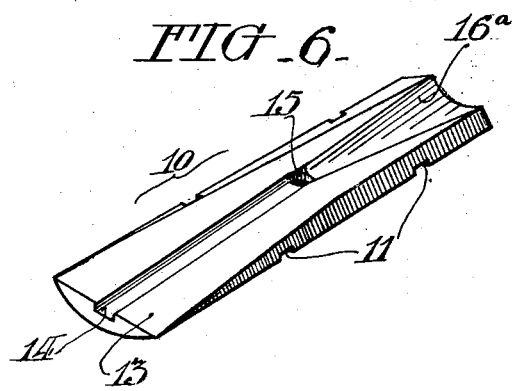
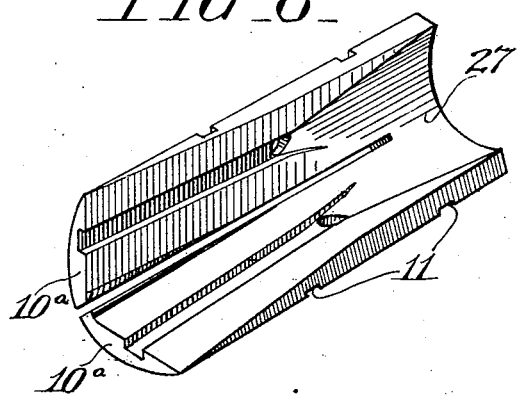
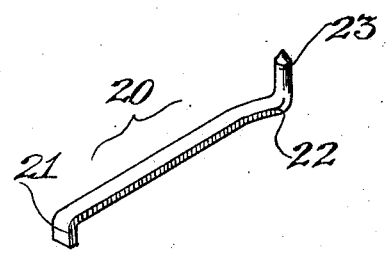

Patented Feb. 3, 1931

1,790,841

UNITED STATES PATENT OFFICE

RUBEN ROSEN, OF PHILADELPHIA, PENNSYLVANIA

EXPANSION BOLT

Application filed August 2, 1927. Serial No. 210,028.

My invention relates to expansion bolts, such as are used for anchoring or securing other material to masonry, wood and the like.

In expansion bolts now in use, no provision is made for preventing the barrel of the bolt from turning while being expanded and such bolts tend to work loose when installed in a structure subjected to vibration. The principal object of my invention is to overcome these disadvantages by providing an expansion bolt having a barrel which is automatically held against turning while being expanded and which will not work loose when once installed.

Another object of my invention is to provide an expansion bolt which may be removed after it has once been installed in masonry or the like and still be in condition for use.

The construction whereby the above objects are accomplished comprises a barrel having gripping members extendable through the sides thereof and a wedging member within the barrel for expanding the gripping members, and means cooperating with the wedge member for moving the same axially of the barrel. The wedging member may be in the nature of a pyramidical nut and the means for moving the nut may be in the nature of a bolt in threaded engagement with the nut.

In the drawings:

Figure 1 is a side elevation of an expansion bolt embodying my invention, and

Figure 2 is an end view thereof.

Figure 3 is a central longitudinal sectional view of the expansion bolt shown in Figure 1, as same would appear when embedded in a wall.

Figure 4 is a detail view of a retaining member,

Figure 5 a perspective view of the wedge nut,

Figure 6 a perspective view of one of the barrel segments, and

Figure 7 a perspective view of a gripping element; all of which form parts of the device shown in Figure 1 but are illustrated on a larger scale.

Figure 8 is a perspective view of a part of a modified form of barrel, drawn to a larger scale than is the device shown in Figure 1.

In the drawings, I have shown the barrel as consisting of four segments 10, but it is to be understood that any number may be employed although three or more are found to be preferable in order that the segments may more uniformly engage the walls of a bore when the barrel is expanded therein than is possible with the two-part barrel ordinarily employed on expansion bolts heretofore produced.

Segments 10 are provided with grooves 11 adapted to accommodate split rings 12 which hold the segments together. Rings 12 may be made of any suitable material but, if they are made of spring material, the bolt may be removed from a wall or the like and be in condition for immediate installation elsewhere. The inside of each segment 10 is tapered to form a flat face 13 through the center of which a groove 14 runs and terminates in an aperture 15. The rear end of face 13 is grooved out to form a trough 16$^a$ whose bottom extends parallel to the outside of the segments so that, when the segments are assembled into a barrel, the several troughs form a bore 16 for accommodating a bolt 17.

Faces 13 are adapted to be engaged by a nut 18 which has been shown as being rectangular in cross-section and tapered in order to conform to faces 13 when the four segments 10 are fastened together by rings 12. Nut 18 is bored throughout its length and provided with threads 19 which are adapted to engage the threads on bolt 17. Each groove 14 is adapted to accommodate a gripping member 20 which has a flanged end 21, an offset portion 22 and a prong 23.

When member 20 is disposed in groove 14, prong 23 will be disposed in aperture 15 with its point very nearly flush with the outside of segment 10 and with its flanged end turned inwardly, as shown in Figures 1 and 3. With gripping members 20 in this position, flanged ends 21 will prevent nut 18 from dropping out of the barrel when bolt 17 is not in place, and prong 23 may be extended through aperture 15 by nut 18 engaging offset portion 22.

When it is desired to secure an object to a structure or the like, a hole of the proper diameter is drilled therein in the customary manner, as shown in Figure 3 in which a hole 24 has been drilled in a fragment of concrete masonry 25 and a fragment of material 26 secured thereto by means of one of my improved bolts. In securing material 26 to masonry 25, a number of methods may be employed but, in a great many cases, I find it convenient to insert the expansion bolt into hole 24 to the required depth, hold the barrel in this position and pull outwardly on bolt 17. This will cause nut 18 to slide upon the offset portions 22 of members 20 and force prongs 23 into masonary 25 sufficiently to hold the barrel assembly in place. Bolt 17 is then unscrewed from nut 18, passed through material 26, the material placed in position, and bolt 17 screwed into nut 18. In this manner, nut 18 is in position to receive bolt 17 when material 26 is in place and is held against rotation by prongs 23.

Now by turning bolt 17 until material 26 comes into contact with the face of masonry 25, nut 18 will be moved farther along faces 13 and will force prongs 23 farther into masonry 25 so that the barrel is rigidly held against turning. As nut 18 moves along faces 13, segments 10 will be moved outwardly, due to the wedging action of the tapered surfaces in contact, until the outside of segments 10 are pressed against the inside of hole 24 with sufficient force to support material 26. Should material 26 be subjected to vibrations or subjected to additional loads, it will tend to move bolt 17 away from the face of masonry 25 and in so doing will tend to move nut 18 with it, thus exerting a greater pressure between the outside of segments 10 and the sides of hole 24, as segments 10 cannot move longitudinally due to prongs 23 being embedded in masonry 25.

When it is desired to remove the barrel assembly from hole 24, bolt 17 may be unscrewed and material 26 removed. Bolt 17 is then threaded into nut 18 and forced farther into the hole, thus sliding nut 18 off of offset portions 22 and allowing them to spring inwardly and withdraw prongs 23 so that the expansion bolt may be removed intact and ready for use elsewhere. When it is intended to use the expansion bolt but once, rings 12 and members 20 need not be made of spring material.

Referring now to Figure 8, two segments 10ᵃ are secured together near one end, as shown at 27, and this form is produced in order to make assembling of the device easier. When made in this manner, the nut end of the barrel segments will engage the inside of the hole at four points while the bolt end will only engage the inside of the hole at two points. Aside from this feature, this form is the same as that shown in the other views.

It is to be understood that the particular construction as herein represented and described may be changed within the scope of the invention as herein set forth and hereinafter claimed to adapt the device to varying circumstances and conditions.

I claim:

1. An expansion bolt including a split barrel having a groove and an aperture, a gripping member in the groove and extendible through the aperture, a tapered nut in the barrel for expanding same and adapted to extend the gripping member through the aperture, and a bolt threaded into the nut.

2. An expansion bolt including a plurality of barrel segments, means for holding the segments together, flat tapered faces formed on the insides of the segments, an angular tapered nut engaging the faces, and a gripping member engaged by the nut and extendible through a segment.

3. An expansion bolt including a plurality of barrel segments, means for holding the segments together, flat tapered faces formed on the insides of the segments, a tapered nut engaging the faces, gripping members disposed between the nut and the segments and extendible through the segments by the action of the nut, and a bolt threaded into the nut.

4. An expansion bolt including a barrel composed of more than two segments, bands surrounding the barrel for holding the segments together, gripping members between the nut and the inside surface of the barrel, prongs on the gripping members extendible through the sides of the barrel, an offset portion on each gripping member adapted to be engaged by the nut for extending the prongs through the sides of the barrel, and a bolt threaded into the nut.

5. In an expansion bolt having apertures in the sides of its barrel, means for preventing the bolt from turning comprising a gripping member having a body part, an offset part on the body part, and a prong on the offset part adapted to be forced through the aperture in the barrel.

6. In an expansion bolt having apertures in the sides of its barrel and a nut in the barrel, means for preventing the bolt from turning comprising a gripping member having a body part, an offset part on the body part, a prong on the offset part adapted to be forced through the aperture in the barrel by the action of the nut, and a flange on the body part for holding the nut in the barrel.

7. In a device of the class described, an expansible barrel having internal longitudinal grooves with apertures at one end, gripping members lying in the grooves and having portions lying in and extendible through said apertures, a wedging member slidable longitudinally of the gripping members, said gripping members having inwardly bent portions at one end to prevent the separation of the wedge from the barrel.

8. In a device of the class described, an expansible barrel having a bore therethrough and flared from an intermediate point to one end and with perforations therethrough, a wedging member in the flared part of the bore and members movably positioned in the flared part of the bore having flanges thereon adjacent the large end of the bore to prevent dislodgment of the wedge from the bore, and gripping prongs exserted through the perforations.

9. An expansion bolt organization including a barrel having a bore, one portion of which is of uniform diameter, another portion flared from an intermediate point toward one end, a wedging nut in the flaring end, said flaring end having longitudinal grooves and apertures at the smaller end of the flared portion, gripping members in said grooves having prongs extendable through said apertures, and flanges at their opposite ends to prevent the separation of the wedging nut from the bore, and means for moving the wedging nut longitudinally of the barrel.

In testimony whereof I have signed my name to this specification.

RUBEN ROSEN.